(12) United States Patent
Komori et al.

(10) Patent No.: US 7,952,013 B2
(45) Date of Patent: May 31, 2011

(54) CONTENTS REPRODUCER AND REPRODUCTION METHOD FOR SELECTING CONTENT TO BE REPRODUCED BASED ON A MOVING TEMPO AND TEMPO INFORMAITON FOR THE CONTENT

(75) Inventors: Akihiro Komori, Tokyo (JP); Susumu Takatsuka, Tokyo (JP); Toru Sasaki, Tokyo (JP); Yuichi Sakai, Kanagawa (JP); Yoichiro Sako, Tokyo (JP); Toshiro Terauchi, Tokyo (JP); Hirofumi Tamori, Tokyo (JP); Makoto Inoue, Tokyo (JP); Katsuya Shirai, Kanagawa (JP); Motoyuki Takai, Tokyo (JP); Kenichi Makino, Kanagawa (JP); Takatoshi Nakamura, Kanagawa (JP); Akane Sano, Tokyo (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 12/160,217

(22) PCT Filed: Jan. 11, 2007

(86) PCT No.: PCT/JP2007/050636
§ 371 (c)(1), (2), (4) Date: Jul. 8, 2008

(87) PCT Pub. No.: WO2007/081051
PCT Pub. Date: Jul. 19, 2007

(65) Prior Publication Data
US 2009/0235811 A1    Sep. 24, 2009

(30) Foreign Application Priority Data
Jan. 12, 2006 (JP) ................... 2006-005022

(51) Int. Cl.
*G10H 1/40* (2006.01)
(52) U.S. Cl. ............ 84/636; 84/604; 84/615; 84/635
(58) Field of Classification Search .......... 84/636
See application file for complete search history.

(56) References Cited

U.S. PATENT DOCUMENTS
2005/0126370 A1   6/2005 Takai et al.
2005/0219055 A1*  10/2005 Takai et al. ........ 340/573.1

FOREIGN PATENT DOCUMENTS
EP    1 533 784    5/2005
(Continued)

*Primary Examiner* — Elvin G Enad
*Assistant Examiner* — Christopher Uhlir
(74) *Attorney, Agent, or Firm* — Oblon, Spivak, McClelland, Maier & Neustadt, L.L.P.

(57) ABSTRACT

Content is selected on the basis of changes of a walking tempo. The walking tempo is detected (S5). In a state determination process (S7), it is determined whether the walking tempo tends to increase, be constant, or decrease. A walking tempo corrective coefficient is calculated on the basis of the determined result and a corrective walking tempo is calculated with the walking tempo corrective coefficient (S9). It is determined whether or not music is changed on the basis of the corrective walking tempo rather than the actually detected walking tempo (S11). When music is changed, relevant music content is searched. Controls are performed in such a manner that when the walking tempo is decreasing, the foregoing state is kept for a while, when the walking tempo is increasing, music is quickly selected according to the increase of the walking tempo, and when the walking tempo is stable, music is not selected.

11 Claims, 4 Drawing Sheets

FOREIGN PATENT DOCUMENTS

| | | |
|---|---|---|
| EP | 1 585 134 | 10/2005 |
| JP | 10 63265 | 3/1998 |
| JP | 2003 85888 | 3/2003 |
| JP | 2003 108154 | 4/2003 |
| JP | 2004 113552 | 4/2004 |
| JP | 2005 274790 | 10/2005 |
| JP | 2006 91313 | 4/2006 |
| JP | 2006 301276 | 11/2006 |
| JP | 2007 149218 | 6/2007 |
| WO | 2004 072767 | 8/2004 |

* cited by examiner

CONTENTS REPRODUCER AND REPRODUCTION METHOD FOR SELECTING CONTENT TO BE REPRODUCED BASED ON A MOVING TEMPO AND TEMPO INFORMAITON FOR THE CONTENT

TECHNICAL FIELD

The present invention relates to a content reproducing apparatus and reproducing method that allow content, for example, music to be automatically selected and reproduced according to a moving tempo of the user who is wearing the apparatus.

BACKGROUND ART

In recent years, there has been a technique of changing reproduction modes of music content by software processes using a personal computer, this technique being referred to as DTM (Desk Top Music). Since these processes require the user to have knowledge about editing of music content using a personal computer, a technique of changing reproduction modes of music content according to simpler operations than those of the foregoing technique or unintentional body motions of the user has been proposed.

For example, Japanese Patent Application Laid-Open No. 2003-85888 describes a portable music reproducing device that detects a walking pitch and changes a music tempo according to the detected walking pitch.

In addition, Japanese Patent Application Laid-Open No. 2005-156641 describes a reproduction mode controlling device and so forth that detect, for example, a walking tempo of the user, and change the reproduction speed and so forth of music content that is being reproduced according to the detected walking tempo.

The devices described in the foregoing patent documents change the reproduction speed of music content according to the walking or running tempo of the user. However, the range of which the reproduction speed of one title of music content was able to be changed was limited and the devices did not always reproduce music content at user's desired tempo.

In addition, the method of simply selecting a song having a tempo nearly equal to the detected tempo from a plurality of songs had a problem of which the selected song was not always comfortable for the user. In other words, songs for which the user feels comfortable are, for example.

Firstly, when the tempo quickly increases from a stop state or a running state to a dashing state, it is preferred that songs be quickly selected according to the tempo that is increasing.

Secondly, when the tempo changes in the decreasing direction from a running state to a walking state or a stop state, it is preferred that songs be not quickly changed, but the running state be kept for a while and then it change to a walking state or a stop state.

Thirdly, when the change rate of a tempo is small, for example, in a walking state or a running state with a constant tempo, it is preferred that songs be not frequently changed.

DISCLOSURE OF THE INVENTION

Thus, an object of the present invention is to provide a content reproducing apparatus and reproducing method that allow songs to be selected according to a tempo that satisfies those requirements so as to comfortably select the songs.

To solve the foregoing problem, the present invention is a content reproducing apparatus which stores content together with tempo information and selects content from a plurality of titles of content on a basis of the tempo information, comprising:

tempo detecting means for discretely detecting a moving tempo;

moving tempo change detecting means for detecting a change of the detected moving tempo; and controlling means for performing controls to select content such that when the change of the detected moving tempo increases, content is changed quickly according to the change of the moving tempo, when the change of the detected moving tempo is nearly constant, content is not changed, and when the change of the moving tempo decreases, content is changed with a delay against the change of the tempo.

The present invention is a content reproducing method of storing content together with tempo information and selecting content from a plurality of titles of content on a basis of the tempo information, comprising:

a tempo detecting step of discretely detecting a moving tempo;

a moving tempo change detecting step of detecting a change of the detected moving tempo; and a controlling step of performing controls to select content such that when the change of the detected moving tempo increases, content is changed quickly according to the change of the moving tempo, when the change of the detected moving tempo is nearly constant, content is not changed, and when the change of the moving tempo decreases, content is changed with a delay against the change of the tempo.

According to the present invention, since it is determined whether a change of the walking tempo of the user is increasing, nearly constant, or decreasing and content selecting methods are changed according to the detected change, content can be changed such that the user feels comfortable.

BEST MODES FOR CARRYING OUT THE INVENTION

Figure 1:
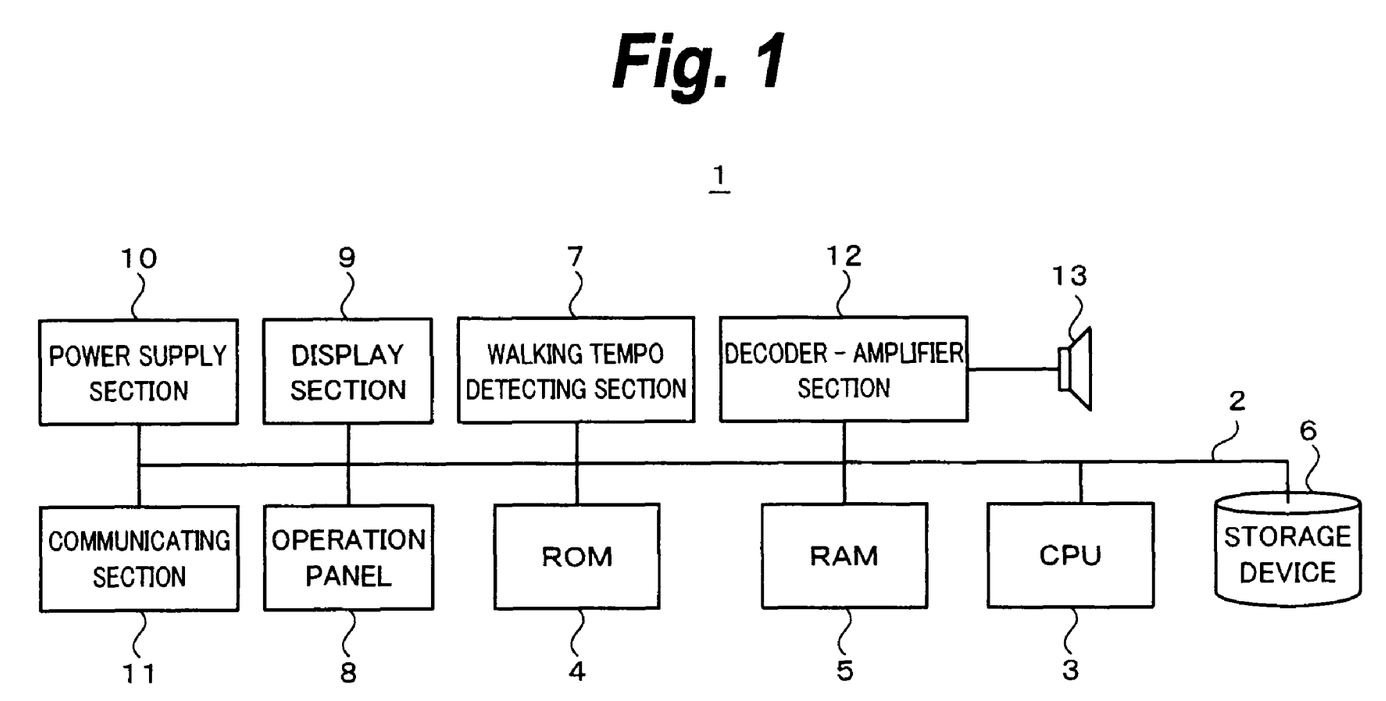
FIG. 1 is a block diagram showing the structure of a content reproducing apparatus according to an embodiment of the present invention.

Next, with reference to the accompanying drawings, an embodiment of the present invention will be described. FIG. 1 shows the structure of a content reproducing apparatus 1 according to the embodiment of the present invention. Connected to a bus 2 of the content reproducing apparatus 1 are a CPU (Central Processing Unit) 3, a ROM (Read Only Memory) 4, a RAM (Random Access Memory) 5, a storage device 6 that stores music content, meta information of music content, a play list that summarizes a plurality of titles of music content, and so forth, a walking tempo detecting section 7, an operation panel 8, a display section 9, a power supply section 10, a communicating section 11, and a decoder-amplifier section 12. In addition, the decoder-amplifier section 12 is connected to a head phone 13. In this embodiment, the content reproducing apparatus 1 is of portable type. With the content reproducing apparatus 1, the user can listen to music content while moving such as walking, running, or physically exercising.

Next, the structure of the content reproducing apparatus 1 will be described in detail. The CPU 3, which is a part of the controlling section, executes a program stored in the ROM 4 to control each section of the content reproducing apparatus 1. For example, the CPU 3 controls each section of the content reproducing apparatus 1 to reproduce music content selected on the basis of the reproduced walking tempo in the manner that will be described later. The RAM 5 is used as a work area with which the CPU 3 executes a program. In addition, the RAM 5 is also used as means for temporarily storing data generated in each process.

In the storage device 6 as a content storing section, a plurality of titles of music content are stored in association with meta information thereof. Meta information is data that describe attributes of each title of music content. Meta information includes, for example, song name of music content, tempo information, number of times of reproduction, genre, performance duration, performers, and time information at which the relevant music content was registered to the storage device 6. When music content is stored in the storage device 6, it may be stored for each play list created under the control of the CPU 3. A play list is created, for example, at each nearly equal tempo. The storage device 6 is composed, for example, of a semiconductor memory, a hard disk, or a removable medium.

The walking tempo detecting section 7 is composed of an acceleration sensor mounted, for example, on the main body of the content reproducing apparatus 1 or the head phone 13. The walking tempo detecting section 7 discretely detects the walking tempo of the user at intervals of a predetermined sampling period. The walking tempo is defined as the mean number of time intervals T after one foot touches the ground until the other foot touches it for a predetermined time period, for example, one minute, in other words, the number of foot steps per minute. Thus, when the user is moving, for example, walking or running at fast speed, the number of foot steps per minute is large. In this specification, the term walking tempo is used for a term that means a general moving tempo of the user for not only a walking state, but a stop state, a running state, and so forth.

When a male adult walks at a slow pace, the moving tempo is around in the range from 105 foot steps/minute to 110 foot steps/minute. When he runs at a fast pace, the moving tempo is around in the range from 120 foot steps/minute to 125 foot steps/minute. Experimental results show that the moving tempo of people is around in the range from 60 to 250 (foot steps/minute) and that the tempo in their unintentional walking state deviates only by around 2%. In addition, it is known that there is a difference of around 70 foot steps/minute in the moving tempo between normal walking and full speed running.

In music content, a tempo is the length of a beat, that is, the speed of a tune. A tune is a basic rhythm at each equal interval of music content. A beat is one time unit. The length of a tune depends on music content, but may change in the same music content. In this specification, as the unit of a tempo, unit BPM (Beat per Minute) that represents the mean number of quarter notes per minute is used.

Information of the walking tempo detected by the walking tempo detecting section 7 is supplied to the CPU 3 through the bus 2. As will be described later, the CPU 3 performs controls to select music content based on the detected walking tempo.

The walking tempo detecting section 7 is not limited to an acceleration sensor, but may be a speed sensor, a pressure sensor, a body motion acceleration sensor, a position sensor, or the like. Instead, the walking tempo detecting section 7 may detect biological information of, for example, pulse, skin perspiration, skin resistance, muscle potential, or body surface temperature of the user to detect the moving tempo of the user on the basis of the biological information. The walking tempo detecting section 7 may be separated from the content reproducing apparatus 1. In this case, the walking tempo detecting section 7 may wirelessly communicate with the content reproducing apparatus 1 to supply the walking tempo to the content reproducing apparatus 1.

The display section 9 is composed, for example, of an LCD (Liquid Crystal Display). The display section 9 displays various types of information based on the operations of the content reproducing apparatus 1. The display section 9 displays, for example, reproduction position information, song name, and so forth of music content.

The operation panel 8 is composed of buttons and so forth disposed on the housing of the content reproducing apparatus 1 and a remote control device connected wirelessly or with a cable to the content reproducing apparatus 1. With the operation panel 8, music content can be, for example, reproduced, fast-forwarded, and rewound. In addition, with the operation panel 8, the user can freely create a play list. Instead, the forgoing display section 9 may be composed of a touch panel as an operation and input section.

The decoder-amplifier section 12 decodes data of music content supplied from the storage device 6 and performs D/A (Digital to Analog) conversion for the decoded music data. Normally, music content stored in the storage device 6 has been compressed according to a predetermined compression-encoding system. The decoder-amplifier section 12 decodes (decompresses) the music content. Data of music content that have been converted into an analog signal are amplified and supplied to the head phone 13. The head phone 13 reproduces music content.

The communicating section 11 has functions of both an interface for connecting a music content download site and an interface for connecting an external device such as a personal computer. The communicating section 11 can be connected, for example, to a music content download site through the Internet, caused to communicate with it, and caused to download desired music content from the music content download site. When necessary, a file conversion process, an encoding process, and so forth are performed for the downloaded music content. The processed music content is stored in the storage device 6 and registered. The content reproducing apparatus 1 can be connected to a personal computer, for example, through a USB of the communicating section 11. Music content that has been ripped from a medium such as a CD can be transferred from the personal computer to the content reproducing apparatus 1.

Figure 2A:
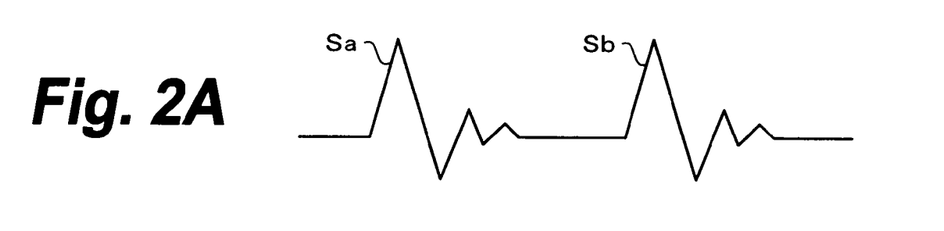
FIG. 2A and FIG. 2B are schematic diagrams used for describing a walking tempo detecting operation according to an embodiment of the present invention.
Figure 2B:
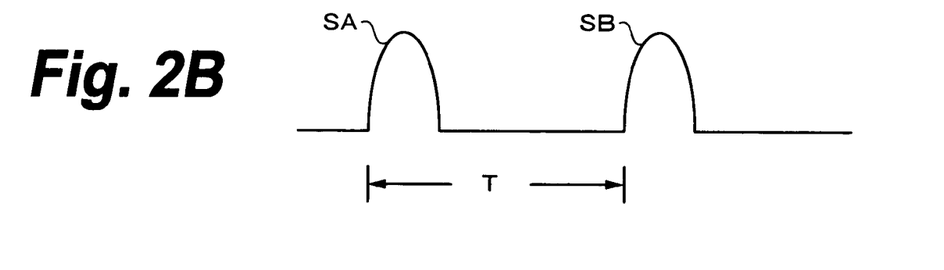

FIG. 2A and FIG. 2B are schematic waveform charts used for describing a tempo detecting operation of the walking tempo detecting section 7. In these charts, the horizontal axis represents the time axis and the vertical axis represents the value of the detected acceleration or vibration. The sensor generates waveforms Sa, Sb, . . . as shown in FIG. 2A as the body of the user who wears the music reproducing apparatus according to this embodiment moves upward and downward. For example, waveform Sa is a waveform that is generated when one foot touches the ground and waveform Sb is a waveform that is generated when the other foot touches the ground.

The detection signal of the sensor is trimmed by a waveform trimming circuit that contains a low-pass filter, a half-wave rectifying circuit, and so forth and thereby waveforms SA, SB, . . . as shown in FIG. 2B are obtained. In addition, for example, by the detection of auto-correlation, period T of waveforms SA, SB, . . . is detected. The walking tempo of the user is detected by the walking tempo detecting section 7 and is defined as the mean number of time intervals T after one foot of the user touches the ground until the other foot touches it for a predetermined time period, for example, one minute, in other words, the number of foot steps per minute. Thus, the larger the number of foot steps per minute is, the faster the user is walking or running.

Next, with reference to a flow chart (FIG. 3) that shows a flow of processes performed under the control of the CPU 3, the operation of this embodiment of the present invention will be described.

Figure 3:
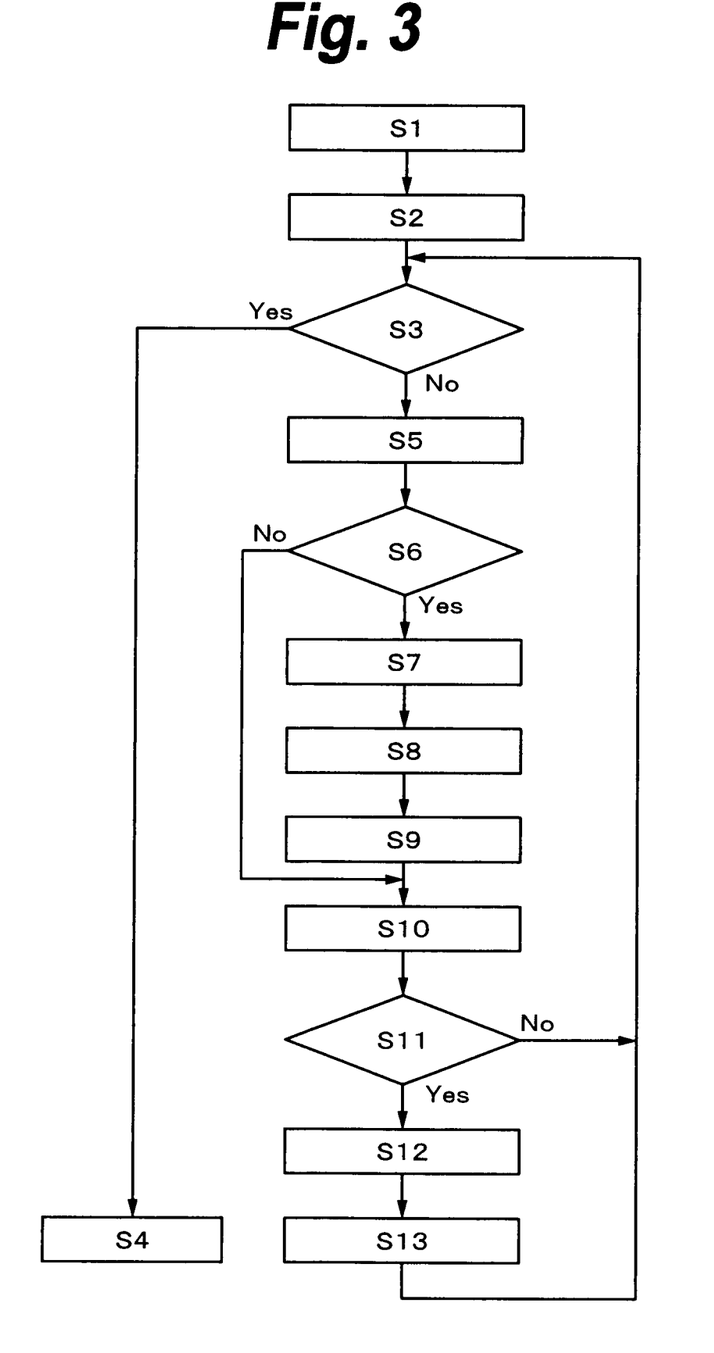
FIG. 3 is a flow chart showing a flow of processes under the control of a CPU of the content reproducing apparatus according to an embodiment of the present invention.

When the operation of the apparatus is started at step S1, an initial value is set. In this case, the initial value is a corrective walking tempo used to initially search for music content. According to a user's operation, for example, by turning on the power switch of the operation panel 8 shown in FIG. 1 or turning on a start switch, the operation of the apparatus is started. At this point, the walking tempo detecting section 7 is also operated to start detecting the walking tempo of the user. The walking tempo can be detected at intervals of a predetermined detection period (sometimes referred to as sampling period) with a small delay of around 1 second.

At step S2, a starting process is performed. In the starting process, the CPU 3 reads a system control program such as a walking tempo process program and data such as a file from the ROM 4. A step S3, it is determined whether or not the processes have been completed. According to a user's operation, for example, by turning off the power switch or the stop switch, the operation of the apparatus is completed. When the determined result denotes that the processes have been completed, a completion process is performed at step S4.

When the determined result at step S3 denotes that the processes have not been completed, the walking tempo is detected at step S5. At step S6, it is determined whether or not the initial value has been set. This determination is performed with a variable stored in the RAM 5. When the determined result denotes that the initial value has not been set, the corrective walking tempo (in this case, the initial value) is stored as the initial corrective walking tempo to the RAM 5. Now, the processes have been completed as a first try.

In a second or later try of the processes, since the walking tempo is detected at step S5, the determined result at step S6 denotes that the initial value has been set. When the initial value has been set, the state is determined at step S7. At step S8, the walking tempo corrective coefficient is calculated on the basis of the determined result of step S7.

At step S9, the corrective walking tempo is calculated with the walking tempo corrective coefficient. At step S10, the obtained corrective walking tempo is stored in the RAM 5.

In the state determination, as will be described later, a process of determining whether the walking tempo is changing or not, namely the walking tempo is increasing, constant, or decreasing. To perform this determination, it is necessary to compare the walking tempo that has been just detected with the walking tempo that has been detected last time and stored in the RAM 5. When the state determination is initially performed, since the walking tempo has not been stored, the initial value is necessary.

As described above, when the determined result at step S6 denotes that the initial value has not been set, the processes of step S7 (state determination), step S8 (decision of walking tempo corrective coefficient), and step S9 (calculation of correction walking temp) are skipped. Instead, the process of step S10 (storing of correction walking temp) is performed. At step S10, the walking tempo that has been initially detected is stored as the initial value to the RAM 5.

At step S11, a music change determination is performed on the basis of the calculated corrective walking tempo. When the determined result at the music change determination step S11 denotes that music content is not changed, the flow returns to the process of step S3 (completion determination).

When the determined result at the music change determination step S11 denotes that music content is changed, music content is searched at step S12. In other words, when the absolute value of the difference between the current corrective walking tempo and the corrective walking tempo that has been determined immediately before the current corrective walking tempo exceeds a predetermined threshold value, it is determined that music content be changed and thereby music content that is closest to the current corrective walking tempo is selected.

At step S13, the searched music content is reproduced. Audio data are output by the head phone 13 through the decoder-amplifier section 12.

A sequence of processes from the foregoing step S3 (completion determination) to step S11 (music change determination) is repeatedly performed until the system operation is completed at intervals of a walking tempo detection sampling period or a period that is a multiple of the sampling period such that the processes quickly follow changes of the walking tempo of the user.

Next, the state determination process (at step S7) of the operation according to this embodiment of the present invention will be described in detail. In the state determination process, it is determined whether the walking tempo tends to increase, be constant, or decrease on the basis of the following conditions. First of all, amount of change s of the walking tempo is calculated on the basis of the following formula.

$$s = T_n - T_{n-1}$$

where Tn represents the current walking tempo that has been detected and Tn−1 represents the walking tempo that has been calculated immediately before the current walking tempo and stored.

When amount of change s of the walking tempo is compared with the threshold value, for example, 5, the state is determined, for example, as follows.

$s \geq 5$: increasing state
$-5 < s < 5$: constant state
$s \leq -5$: decreasing state Thereafter, a process of determining the walking tempo corrective coefficient is performed (at step S8) and then a calculation process for the corrective walking tempo is performed (at step S9). The corrective walking tempo is calculated with walking tempo corrective coefficient α (where $0 \leq \alpha \leq 1$) as follows.

$$T'_n = \alpha T_n + (1-\alpha) T'_{n-1}$$

where T'n represents the corrective walking tempo, Tn represents the current walking tempo that has been detected, and T'n−1 represents the corrective walking tempo that has been calculated immediately before the current corrective walking tempo and stored.

When walking tempo corrective coefficient α of this formula is controlled on the basis of the state determination result, corrective walking tempo T'n1−1 that has been calculated immediately before the current walking tempo and stored can be reflected to current walking tempo Tn that has been detected. In other words, the corrective walking tempo used on the basis of which it is determined whether or not music content is changed is not the walking tempo that has been actually detected, but what is formed by corrective walking tempo T'n−1 and coefficient α.

Figure 4:
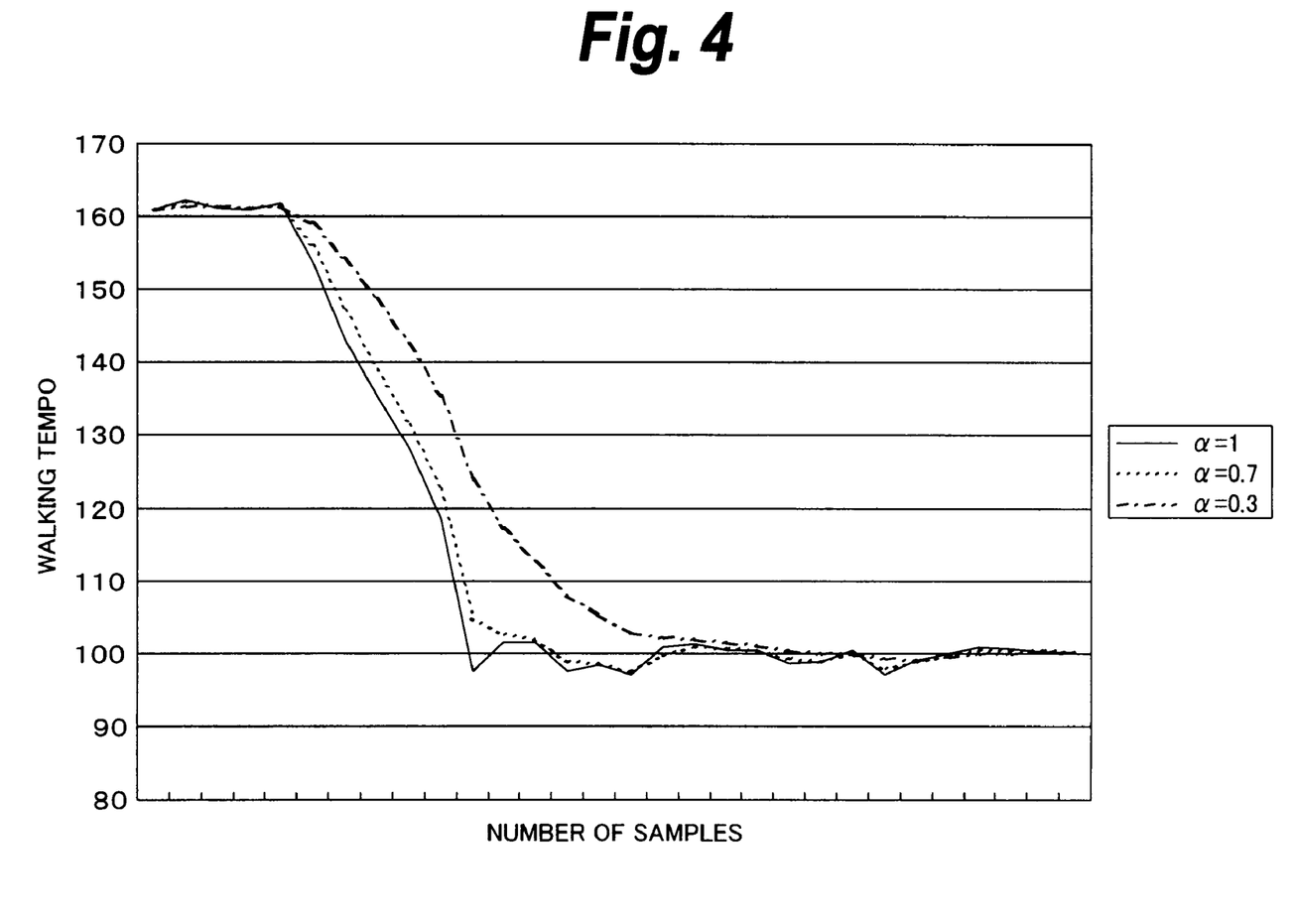
FIG. 4 is a graph showing an example of a correction of a walking tempo based on a walking tempo corrective coefficient according to an embodiment of the present invention.

FIG. 4 shows an example of the relationship between walking tempo corrective coefficient α and a corrective walking tempo that is output. In this graph, the horizontal axis represents intervals of a detection sampling period of the walking tempo and the vertical axis represents the value of the walking tempo. Experiments show that the moving tempo of people is around in the range from 60 to 250 (foot steps/minute) and that the tempo in unintentional walking state deviate only by around 2%. In addition, it is experimentally known that there is a difference of around 70 foot steps/minute between the normal walking state and the full speed running state. FIG. 4 exemplifies changes from a full speed running state to a normal walking state.

In the case that walking tempo corrective coefficient α is 1, as represented by changes of a solid line, the detected walking tempo is the same as the corrective walking tempo. In the case of (α=0.7), as represented by changes of a broken line, changes of the walking tempo delay against the walking tempo that is actually detected and the corrective walking tempo of which the walking tempo that has been actually detected has been smoothened is obtained. In the case of (α=0.3), as represented by changes of a dash-dot line, changes of the walking tempo delay against the walking tempo that has been actually detected and the corrective walking tempo of which the walking tempo that has been actually detected has been smoothened is obtained. When the case of (α=0.3) is compared with the case of (α=0.7), the delayed amount and the smoothened amount of the walking tempo that has been actually detected in the former is larger than those in the latter.

As is clear from the example shown in FIG. 4, when the walking tempo decreases from a person's full speed running state to his or her waling state, changes of the corrective walking tempo used to select music content are delayed and smoothened. Thus, even if the full speed running state is stopped, music content is not quickly changed. Instead, after the reproduction state of music content in the full speed running state is kept for a while and then the reproduction state of music content in the walking state is started.

In the foregoing example, "when the walking tempo decreases, the preceding state is kept for a while and then music content is selected". According to this embodiment, in addition to that process, a process "when the walking tempo increases, music content is quickly selected according to the state" and a process "when the walking tempo is stable, music content is not selected" are performed. To perform these three processes, walking tempo corrective coefficient α is set on the basis of amount of change s of the walking tempo as follows.

In the case of s≧5, α=1.0
In the case of s<5, α=0.1

In this example, there are one condition determinative threshold value and two types of walking tempo corrective coefficient α. Instead, with many different threshold values, walking tempo corrective coefficient α may be set more finely such that the corrective walking tempo is more finely controlled. In this case, the user may set the threshold value and walking tempo corrective coefficient with the operation panel 8. Instead, the threshold value and walking tempo corrective coefficient may have been stored in the ROM 4.

Thereafter, it is determined whether or not music content is changed on the basis of the corrective walking tempo (at step S11). When the following formula is satisfied, it is determined that music content be changed.

$$T'n - T'n{-}1 \geq d$$

where T'n represents the current corrective walking tempo, T'n−1 represents the corrective walking tempo that has been detected immediately before the current corrective walking tempo and stored, and d represents the threshold value. Threshold value d is set, for example, to around 10 on the basis of an experimental result or the like.

In the foregoing manner, the walking tempo is detected, a process of calculating the corrective walking tempo used to select music content is performed on the basis of the detected walking tempo, and then a music change determining process is performed. When the result of the music change determination (at step S11) is true, the CPU 3 searches the music content stored in the storage device 6 for desired music content in a search condition of which music content stored in the storage device 6 is searched for music content having a tempo closest to the corrective walking tempo. As a searched result, music content having a tempo close to the current walking tempo of the user is selected and the selected music content is reproduced. According to this embodiment of the present invention, a sequence of processes can be repeated at intervals of a tempo detection sampling period. As a result, music content can be selected according to changes of the walking tempo, that is, with a high follow-up capability against changes of the walking tempo.

Audio data of the reproduced music content are converted and amplified by the decoder-amplifier section 12 and then output from the head phone 13.

Embodiments of the present invention have been described. However, the present invention is not limited to such embodiments. Instead, various modifications may be made on the basis of the technical idea of the present invention. The value of the threshold value is just exemplary. Thus, it may be another value.

In addition, the present invention is applied not only to an audio reproducing apparatus, but to portable reproducing apparatus having other functions of a mobile phone, a PDA (Personal Digital Assistants), an audio recording device, a digital camera, and so forth.

In addition, each means that composes the reproducing apparatus of the present invention may be accomplished by dedicated hardware, a method, or a programmed computer. In addition, a program that describes contents of processes may be recorded to a computer readable record medium such as a magnetic recording device, an optical disc, a magneto-optical disc, or a semiconductor memory.

The invention claimed is:

1. A content reproducing apparatus which stores content together with tempo information and selects content from a plurality of titles of content on a basis of the tempo information, comprising:

tempo detecting means for discretely detecting a moving tempo;

moving tempo change detecting means for detecting a change of the detected moving tempo; and controlling means for performing controls to select and change a reproduced content, such that:

according to a first process, when the change of the detected moving tempo indicates the moving tempo is increasing, and the change is at or above a first threshold, the reproduced content is changed such that a time for changing reproduced content directly relates to an amount change of the moving tempo, according to a second process, when the change of the moving tempo indicates the moving tempo is decreasing, and the change is at or below a second threshold, the reproduced content is changed such that a time for changing reproduced content inversely relates to an amount change of the moving tempo, according to a third process, when the change of the detected moving tempo is between the first and second thresholds, the reproduced content is not changed, and in the second process, the detected moving tempo is modified to cause the change of the reproduced content to be delayed relative to the change of the reproduced content in the first process.

2. The content reproducing apparatus as set forth in claim 1, wherein the moving tempo change detecting means detects the change of the moving tempo at intervals of a detection period of the tempo detecting means or at intervals of a multiple of the detection period.

3. The content reproducing apparatus as set forth in claim 1, wherein the content is music content or picture content.

4. A content reproducing method of storing content together with tempo information and selecting content from a plurality of titles of content on a basis of the tempo information, comprising:

a tempo detecting step of discretely detecting a moving tempo;

a moving tempo change detecting step of detecting a change of the detected moving tempo; and a controlling step of performing controls to select and change a reproduced content, such that:

according to a first process, when the change of the detected moving tempo indicates the moving tempo is increasing, and the change is at or above a first threshold, the reproduced content is changed such that a time for changing reproduced content directly relates to an amount change of the moving tempo, according to a second process, when the change of the moving tempo indicates the moving tempo is decreasing, and the change is at or below a second threshold, the reproduced content is changed such that a time for changing reproduced content inversely relates to an amount change of the moving tempo, according to a third process, when the change of the detected moving tempo is between the first and second thresholds, the reproduced content is not changed, and in the second process, the detected moving tempo is modified to cause the change of the reproduced content to be delayed relative to the change of the reproduced content in the first process.

5. The content reproducing method as set forth in claim 4, wherein the moving tempo change detecting step is performed by detecting the change of the moving tempo at intervals of a detection period at the tempo detecting step or at intervals of a multiple of the detection period.

6. The content reproducing method as set forth in claim 4, wherein the content is music content or picture content.

7. A content reproducing apparatus which stores content together with tempo information and selects content from a plurality of titles of content on a basis of the tempo information, comprising:

a tempo detecting unit to discretely detect a moving tempo;

a moving tempo change detecting unit to detect a change of the detected moving tempo; and a control unit to control selection and change of a reproduced content, such that:

according to a first process, when the change of the detected moving tempo indicates the moving tempo is increasing, and the change is at or above a first threshold, the reproduced content is changed such that a time for changing reproduced content directly relates to an amount change of the moving tempo after, according to a second process, when the change of the moving tempo indicates the moving tempo is decreasing, and the change is at or below a second threshold, the reproduced content is changed such that a time for changing reproduced content inversely relates to an amount change of the moving tempo, according to a third process, when the change of the detected moving tempo is between the first and second thresholds, the reproduced content is not changed, and in the second process, the detected moving tempo is modified to cause the change of the reproduced content to be delayed relative to the change of the reproduced content in the first process.

8. The content reproducing apparatus as set forth in claim 1, wherein:

a corrective coefficient is applied to the detected moving tempo, the corrective coefficient having a first value for the first process and a second value for the second process, to generate a corrected moving tempo, the controlling means controls the change of the reproduced content based on a rate of the corrected moving tempo, and the second value is lower than the first value, causing the change of the reproduced content in the second process to be delayed relative to the change of the reproduced content in the first process.

9. The content reproducing apparatus as set forth in claim 8, wherein the reproduced content is changed when a difference between the corrected moving tempo and a corrected moving tempo for a time period immediately prior to the corrected moving tempo is more than or equal to a third threshold value.

10. The content reproducing apparatus as set forth in claim 9, wherein the controlling means controls the selection and change of the reproduced content according to the following:

for determining control according to the first, second or third process, $s = T_n - T_{n-1}$, where s is the amount of change of the detected moving tempo, $T_n$ is a currently detected moving tempo for a time period n, $T_{n-1}$ is a detected moving tempo for a time period immediately prior to the time period n, and s is compared to the first and second thresholds;

$T'_n = \alpha T_n + (1-\alpha) T'_{n-1}$, where $T'_n$ is a corrected moving tempo for the time period n, $T'_{n-1}$ is a corrected moving tempo for a time period immediately prior to the time period n, and $\alpha$ is the corrective coefficient; and d is the third threshold value, such that when $|T'_n - T'_{n-1}| \geq d$, the reproduced content is changed.

11. The content reproducing apparatus as set forth in claim 9, wherein the first, second and third threshold values and the first and second values of the corrective coefficient are user-definable by an operation panel of the content reproducing apparatus.

* * * * *